United States Patent [19]

Lomelin et al.

[11] Patent Number: 5,035,909
[45] Date of Patent: Jul. 30, 1991

[54] PROCESS FOR DEHYDRATING TOMATOES

[75] Inventors: Juan M. Lomelin; Maria C. Vaqueiro, both of Legaria, Mexico

[73] Assignee: Imit, A.C., Mexico

[21] Appl. No.: 564,034

[22] Filed: Aug. 7, 1990

[51] Int. Cl.$^5$ .............................................. A23B 7/00
[52] U.S. Cl. .................................... 426/473; 426/489
[58] Field of Search ............... 426/471, 472, 473, 469, 426/481, 489, 518

[56] References Cited

U.S. PATENT DOCUMENTS

| | | | |
|---|---|---|---|
| 3,290,788 | 12/1966 | Seelandt | 34/5 |
| 3,323,923 | 6/1967 | Fiore | 426/473 |
| 3,634,128 | 1/1972 | Bolin | 426/471 |
| 3,892,877 | 7/1975 | Wagner et al. | 426/489 |
| 3,976,805 | 8/1976 | Becker | 426/489 |
| 4,031,266 | 6/1977 | Mitchell et al. | 426/599 |
| 4,717,578 | 1/1988 | Biller et al. | 426/599 |

FOREIGN PATENT DOCUMENTS

| | | |
|---|---|---|
| 978021 | 11/1975 | Canada . |
| 1924490 | 11/1969 | Fed. Rep. of Germany . |
| 1943798 | 3/1970 | Fed. Rep. of Germany . |
| 201847 | 8/1988 | German Democratic Rep. . |
| 1045453 | 11/1975 | Italy . |
| 7601204 | of 0000 | Netherlands . |
| 464666 | 12/1967 | Switzerland . |
| 581919 | 11/1977 | U.S.S.R. . |

Primary Examiner—George Yeung
Attorney, Agent, or Firm—Darby & Darby

[57] ABSTRACT

Tomatoes are dehydrated by selecting red, ripe tomatoes and washing the selected tomatoes with a biocide and then rinsing with fresh water. The rinsed fruit is cut into approximately cubical chunks and blanched by heating the chunks to a temperature at or below the boiling point of water for a period of less than 10 minutes to inactivate the enzymes contained in the tomato. The blanched tomatoes are cooled to room temperature and then pulped. After removing skin and seeds to form a tomato juice from the pulp chunks, the juice is evaporated under vacuum to form a paste-like concentrate having a solid content from abot 20% to about 35%. Air trapped in the concentrate is removed. The concentrate is then formed into pieces and dried until the moisture content of the pieces is between about 3% and about 4%.

13 Claims, 1 Drawing Sheet

FIG. 1

PROCESS FOR DEHYDRATING TOMATOES

FIELD OF THE INVENTION

The present invention refers to a process for dehydrating tomatoes and, more particularly, it relates to an improved process for dehydrating tomatoes without losing the rheological, organoleptic and nutritional characteristics of the natural product.

BACKGROUND OF THE INVENTION

It is well known in the art that the dehydrated products offer numerous advantages with respect to the original natural products, such as a more prolonged preservation of quality, more efficient transportation and storage without refrigeration, less storage space per unit of solids, and considerable decrease in transportation costs per unit of solids.

In the particular case of tomatoes, the obtention of a granulated dehydrated product constitutes a very important processing option, inasmuch as this product has acquired a great demand at the international level. The powdered dehydrated tomato shows numerous advantages with respect to the paste obtained from tomato, due to the dehydration degree achieved, which permits the handling of much larger amounts of solids per unit of volume, as well as the removal of any microbial growth and other chemical or biochemical processes that damage the quality of the product. All of the above is highly advantageous for the manufacturer and the consumer from the economical standpoint, because the manufacturer will be able to offer, and the consumer will be able to acquire, a product of excellent quality at a reasonable price.

In later years, due to the high degree of technicalization of this process, it has been possible to obtain a dry material having a very good quality, which gradually acquires more demand from companies engaged in the preparation of dehydrated or semi-cooked foods, such as vegetable soup, dry pastes, juices, sauces, infant food, salad dressings and seasoners.

The most adequate drying method for a food product is determined by the requirements of quality and by economical factors, whereby it has been considered as indispensable to select the method which, being the most economical one, will furnish the desired characteristics of quality in the product obtained.

Many different drying processes are known in the prior art for dehydrating tomatoes and other vegetables, some of which will be described hereinbelow, but none of which has been able to produce a dehydrated product that may preserve the necessary physical and sensorial or organoleptic qualities of flavor, color, aroma and the like, or which are only able to produce a product that retains such characteristics only through very costly operations that increase the cost of the dehydrate product.

Among the many drying processes for tomatoes known in the prior art, the direct drying of tomato slices may be mentioned, in which the tomato fruits are washed and mechanically sliced by the action of very sharp knives which avoid tearing the fruits. The slices are placed in pans containing mineral oil to avoid sticking of the product and the drying is carried out in tunnels until a moisture of approximately 4% is obtained. This drying operation has also been effected by means of the use of solar energy. The product is milled in hammer mills and quickly put in moisture-proof containers in order to avoid absorption of water due to the high hygroscopicity of the powdered material.

It is to be stated that this simple drying process which has been used in the prior art, does not produce a product which may be reconstituted to its original size and shape, after rehydration thereof, but that the dehydrated tomato particles, after rehydration, remain collapsed, even after being soaked in water and cooked. This product, therefore, has been restricted for use in mixtures of dry soups, dehydrated mixed vegetables, canned soups, "chili con carne" and the like. Also, in order to obtain an acceptable product by means of this method, it is necessary to use a variety of tomatoes having a bright red color, a high solids content, a thick skin and a high level of pectin.

Many other drying processes for tomatoes are known in the art, all of which require the carrying out of several previous operations that are common to all processes and that therefore will be described hereinbelow as admitted prior art.

The tomato fruits are selected, in order to remove those presenting an inadequate ripening degree, an intensive contamination by molds or insects and physical damage, inter alia. The selected tomato fruits are then ruptured and milled, pulped or disintegrated, in order to form a juice or pulp of the fruit, from which the skin and the seeds are removed, and the pulping operation is continued until the particle size is reduced to the desired dimensions. The breaking of the tomato may be made in hot or in cold, but the hot breaking, comprising heating the fruit to a temperature of at least 104° C. for at least 15 seconds, is preferred in view of the fact that by this means the deactivation of the pectinolytic enzymes (pectinesterase and polygalacturonase) is readily accomplished, thus avoiding hydrolysis of the pectic material. The natural pectins of the tomato account for the suspension of the solids of the juice, after the extraction thereof.

The so called cold breaking of the tomato has also been used in the processes of the prior art, and it has been effected by means of the heating of the tomato fruits to facilitate the release of the skin, thus facilitating the extraction of the pulp and consequently increasing the yield of the process. The enzymes contained in the fruit hydrolyze the pectic substances, thus permitting the resulting juice to be concentrated to levels above 30° Bx. However, if the product is handled at lower concentrations, its rheological characteristics are damaged, whereby it is normally necessary in this process to add thickening agents.

The thus obtained pulp is concentrated either at ambient pressure or preferably at reduced pressure, in view of the fact that the vacuum evaporation of the juice permits the obtention of a product having a better quality by decreasing the thermal damage. The degree of evaporation used in the prior art has depended on the type of breaking and drying methods to which the product is to be subjected.

The above described stages have been common to all existing processes of dehydrating tomatoes in the prior art, regardless of the drying operation used, and in this particular respect it is to be stated that many different drying processes have been used for dehydrating tomato in accordance with the prior art.

One of the most popular drying methods used in the prior art is the lyophilization of the concentrate obtained in accordance with the above described stages, which comprises freezing the concentrate and then drying the same under high vacuum conditions in order to allow the water in the solid state to sublimate at low temperature. That is, the water is removed from the material by passing directly from the solid to the gaseous state, without passing through the liquid state. In this manner, the solids are maintained in its initial structure, without losing its shape and original size and thus, the structure of the lyophilized particles is very porous, preserving the spaces originally occupied by the water without collapsing, which favors the fast reconstitution of the product when rehydrated.

Although this process has been used at an industrial level in the prior art, it is to be stated that, while the process is capable of obtaining a dehydrated product having excellent characteristics, the conditions necessary to carry out this type of drying operation involve very low temperatures and a high vacuum, for which a very costly equipment is required and for which considerable periods of time are consumed in the drying operation, thus rendering said process relatively costly whereby the products obtained must be sold at a higher price.

One other process which is presently being used in the dehydration of tomatoes, as an attempt to overcome the problems of the lyophilization process as to cost, is the so called expansion drying process, which was introduced in the industry during the '60s, and which comprises an expansion-dehydration by the use of hot air, with which the workers in the art were trying to obtain a product similar to that obtained by means of the lyophilization process.

The expansion drying process generally requires absolute pressures of the order of 2.6 mm of mercury for carrying out the dehydration, and the temperature of the material is usually between 60 and 70° C., although in the initial stages said temperature may be increased up to 90° C. The temperature of the product may vary from low temperatures in the initial stage of the cycle, up to the temperature of the drier in the final stages. The drying times are of from 90 minutes to 4 to 5 hours in order to obtain a moisture content of approximately 3%, and the dried product is cooled before breaking the vacuum, so as to avoid the expanded structure to be collapsed, due to the fact that the thus obtained product is frequently thermoplastic.

The expansion drying differs from lyophilization in two main aspects, namely, the use of temperatures above the freeze point, which permits that, during the drying operation, a higher vapor pressure be obtained and, consequently, a lower drying time may be rendered possible. The other difference is the degree of expansion of the product, which is higher than with lyophilization in view of the fact that in the latter no change in volume is produced. The expanded structure furnishes to the dry material characteristics of quick reconstitution by rehydration and the high ratio of area/volume permits a good heat transfer and steam absorption, although if the expansion is higher than desirable, the heat transfer through the expanded structure is reduced and some wet or frozen areas may remain at the center of the mass.

Although this process has been used for dehydrating a multiplicity of vegetable materials, it has been found that when applied to the tomato concentrate obtained by means of the prior stages defined above, the tomato mass cannot be easily expanded without the previous incorporation of air. The non-aerated material is very slowly dried, with the obtention of a hard vitreous product having a volume similar to that of the concentrate and providing a very slow reconstitution. When air is incorporated into the concentrate in order to provide a bulk density of from 0.9 to 1.0 g/ml., the material can be expanded, dried and reconstituted in a satisfactory manner. However, in the most modern expansion drying processes applied to tomato concentrates, the product must be removed from the drier at an intermediate time during the drying operation, expanded outside the drier and returned to the drier, which causes a considerable problem of controlling the drying operation as a whole, whereby this process has not resulted in a suitable process for dehydrating tomatoes, and has been rather used for the dehydration of other different products such as mushrooms an the like. On the other hand, the cost of the provision of the vacuum necessary for the expansion, also renders this process relatively costly.

One other very popular drying process used for the dehydration of vegetable products in the spray drying process, in which the material in very small droplets is flash-dried in contact with a hot gaseous stream, the dry particles being carried out or entrained in said gaseous stream. The small size of the particles permits a very fast drying and the residence time of the material in the drier is of only a few seconds at most. The dried product is recovered from the gaseous stream by means of a suitable separation equipment and the dry powder is recovered from the system and cooled in a continuous manner, so as to avoid any thermal damage through prolonged contact with the hot gases.

When each droplet of the liquid product is being dried, the temperature of the product is maintained at the level of the wet bulb temperature of the drying gases, whereby the relatively high dry bulb temperature of said drying gases may be tolerated, thus causing a minimum thermal damage to the thermally sensitive components of the concentrate. On the other hand, the rate of the reactions that may damage the food products decreases when the moisture level is also decreased and thus, in the final stages of the drying process, where the temperature may increase beyond that of the wet bulb, no severe damage is caused to the product.

The spray dried particles are normally hollow spehres or fragments of spheres, and this shape of the final product is responsible for the excellent rehydration properties of the spray dried powders. This process is the most popular for use in the dehydration of tomatoes, and the dry product is presently commercialized with or without the addition of certain additives, and is used in the manufacture of juices, mashed tomato, pastes, soups and sauces. The tomato solids obtained by the spry drying process show a multiplicity of advantages such as low cost, and remarkable ease of handling, packaging and transportation and admixing.

Of all the above described techniques for the dehydration of tomatoes, the spray drying method would seem to be the most suitable process applied in prior art installations for the obtention of a high quality powder at a reasonable cost. However, the driers used for these purposes require a very special design of the drying chamber, which may permit the droplet which is being dehydrated to be dried without suffering any overheating. On the other hand, special handling and packaging techniques are required in order to avoid rehydration of the powder in view of its highly hygroscopic character.

Several types of designs of spray driers for this purpose are available in the market, both for carrying out the spray drying operation under conditions of moderate temperatures (75° to 90° C.) and using air as the drying gas, which permits to have a high production speed, or for carrying out the spray drying operation by the use of low temperature conditions (25°-30° C.) and by the use of humidified air. However, all these spray driers for use in the dehydration of tomatoes require extremely tall drying chambers, and therefore considerable heights in the apparatus to be erected, with the consequent increase in costs of installation of the plants.

For instance, applicant has information about a spray drier of the low temperature type which has been built with a height of approximately 80 meters and a diameter of approximately 16 meters, using a rotary spraying apparatus of low velocity, in order to obtain yields of about 200 kg. per hour of dehydrated powder. However, these driers must be normally operated with pastes obtained by the method of cold breaking and, although the powder obtained presents good fluidity and low tendency to agglomerate, when reconstituted it lacks body and presents a fast sedimentation, thus requiring the addition of thickeners in order to compete with other types of powder obtained by hot breaking of the material.

Examples of the above type of spray driers have existed for some time. It may be mentioned, for instance, that in 1967 Tree Valley Growers, of Modesto, Calif., started operations in the area of tomato dehydration, through the use of a Danish equipment formed by a tower about 30 meters high and with a capacity of production of 1,356 metric tons of dehydrated food products per year.

One other example exists in Spain where spray dried tomato powder has been prepared, with the addition of citric and ascorbic acids to compensate for the losses of vitamin C caused by the heat applied in the previous concentration step which is necessary for producing a paste of the necessary consistency for use within the spray drier itself.

The above type of drying operation for the obtention of dehydrated tomatoes, although very popular in the field, may be regarded as involving extremely high costs of installation of equipment, as well as difficult controls in the operation.

During the 1960s, the dehydration of vegetable products on a foam mat gained great attention. Initially the workers in the art thought that this type of drying would show a great number of advantages over other dehydration systems, inasmuch as in the particular case of the foam mat drying operations the loss of water was very fast, due to the movement, by capillarity, of the liquid fraction, which is separated from the bubbles of the foam and thus, by providing a porous structure, the rehydration of the product was almost instantaneous.

The key for this type of drying process was based on the formation of a stable foam, by the addition of foaming products such as soy protein, albumin, fatty acid esters and saccharose, as well as glyceryl monostearate, among other foaming products. This type of drying was used for instance by Patterton Canning Co., by transforming the tomato pulp into a foam through the addition of glyceryl monostearate, added to the pulp in a 10% dispersion in warm water. The foam was obtained by stirring and was deposited on drying pans, where by means of air streams, pores were opened to facilitate the dehydration by increasing the drying area. The air was fed to the drier at temperatures of about 93° C. and at a high velocity of about 100 to 130 meters per second, in a countercurrent direction. The times of drying were of from 15 to 18 minutes, depending on the characteristics of the product and on the conditions used.

Although this type of processes utilizing foam mat drying were considered at the time as capable of obtaining a product with improved flavor and color as compared to the spray drying and drum drying operations, the process had the disadvantages that the packaging of the obtained products had to be done in areas with conditioned atmosphere having relative moisture levels of 50% or less, in order to avoid the absorption of moisture due to the hygroscopicity characteristics thereof.

Also, in order to have a reasonable shelf life, a packaging material impermeable to gases and to ambient moisture was necessary and the product had to be packed in inert atmospheres in order to avoid damaging changes caused by oxygen on the components of the tomato.

Moreover, the reconstitution of the product by the addition of water furnished a product with a discolored aspect due to the retention or air bubbles, which rendered the product less red than the natural product. On the other hand, it was found out that during the concentration of the tomato juice, as well as in the first stages of the drying operation, a great proportion of the original aroma was lost through the volatilization of large amounts of volatile low molecular weight products, which damaged the organoleptic characteristics of the reconstituted product. Also, the evaluation of the shelf life of the product obtained by this process, proved that during a prolonged storage of the tomato powder, unpleasant flavors were developed, these being affected by the temperature of storage, and it was determined that the components that suffered the most important changes were the free aminoacids, even at storage temperatures as low as 0° C. The changes of the concentration of aminoacids were observed in the paste, in the dried product and in the stored product, and said changes were also associated with a considerable loss of the color characteristics, since the product was darker than the products obtained by other processes.

One other process that was used during the 1940s was the drum drying process in order to produce dehydrated tomato flakes having a reasonable quality, which process was considerably improved during the 1960s, by modifying the drum driers with the aim of improving the flavor and color characteristics as well as the stability of the powdered dehydrated tomato. These modifications included the incorporation of an air stream in countercurrent with the direction of rotation of the drums, as well as the adaptation of the collecting zones by providing them with an atmosphere having a relative humidity from 15 to 20%.

This process, however, never accomplished the goal of truly dehydrating tomatoes, because it was indispensable to leave moistures of at least 7% in the product, thus requiring a further drying step for more than 24 hours with air at 20° C. without movement, inasmuch as otherwise the product was deteriorated as regards the color and the flavor.

Other known processes for dehydrating tomato solids are based on a fractional drying process, by means of which the juice, before concentration thereof, was centrifuged in order to obtain two separate fractions, a solids fraction and a serum fraction, which latter fraction was concentrated under vacuum, to be thereafter dried also under vacuum to moisture levels of about 3%. The solids fraction was also dehydrated under vacuum and finally the two fractions already dried were admixed and milled in order to obtain a product having good characteristics of reconstitution. This type of processes, however, require a strict control in the centrifugation and in the drying of the separate fractions, with the consequent increases in the costs of production of the product utilizing this method.

Many other processes are known in the art, and have been patented in various countries of the world, such as the process described in Japanese Patent Publication 9,272/62, which refers to a process for dehydrating tomato derivatives such as catsup, wherein carboxymethylcellulose is incorporated to the material under dehydration, and the dehydration is effected either by spray drying or by lyophilization.

U.S. Pat. No. 3,290,788 patented Dec. 13, 1966, describes a process for drying organic materials in liquid solution which is applicable in general to any organic liquid such as milk, fruit juices, vegetables, etc., and in which the dehydration of said organic materials is effected by lyophilization using very special conditions, such as the application of radiation to the frozen product under vacuum, by using adequate wavelengths in order to sublimate the water without furnishing any heat to the product.

U.S. Pat. No. 3,323,923 patented June 6, 1967, describes an improvement in the foam mat drying method for dehydrating food materials, in which the improvement resides on the use of different stabilizing agents for the foam, such as esters derived from monoglycerides of higher fatty acids, polyglycerines and polyglycerine esters. Other than the use of this different stabilizing agents for the foam, the process described in this patent is exactly the same that already described in the admitted prior art.

U.S. Pat. No. 3,567,469 to Corn Products Co., describes a process for removing water from thermosensitive food products, which comprises the formation of a stable dispersion of the finely divided product, to which a water repellent was added, in order to permit the moisture to be evaporated from the films formed, in a continuous and fast manner by de use of evaporating systems. The time of drying varies from 2 to 3 seconds up to 10 minutes, and the product may reach a maximum temperature of about 65° C. and a final moisture content of about 4%. This process, however, incorporates foreign materials to the product, such as the necessary water repellent for the formation of the films of water, which may be regarded as a disadvantage in view of the fact that the flavor and the color of the finished product are damaged to a certain extent.

Swiss Patent 464,666, published Dec. 13, 1967, describes the obtention of instantaneous powders of different organic products, including tomato, by means of a special type of dehydration which is effected by placing the material in layers over a solid porous material, and thereafter forcing a drying gas through the pores of the solid material upwardly to traverse the layer of the product for a time sufficient for effecting the dehydration of the latter. This process, however, shows the disadvantage that a very special type of porous solid material must be used, and the necessity of using an inert gas such as nitrogen or carbon dioxide when treating materials which may be damaged through oxidation. Only in the case of non-oxidatable products may purified air be used. Food products such as tomatoes are highly damaged through oxidation, the necessity of using an insert gas for the drying operation is of course a problem that can only be solved through costly installations for producing such an inert gas, and on the other hand the drying of the products may need times as long as 200 hours, which renders said process rather impractical.

German Patent 1,924,490 published Nov. 20, 1969 describes a drum drying process for the obtention of dehydrated tomatoes, wherein a traditionally known drum drying operation is used in order to obtain tomato flakes, using for the obtention of a sufficiently well formed flake certain amounts of flour or starches to increase the consistency of the mixture to be dried on the drum. The addition of these foreign products such as starches an flour to the original product, however, considerably affects the final properties of the dehydrated product.

German Patent publication 1,943,798 published Mar. 5, 1970, in turn, describes a process for dehydrating fruits and vegetables suspended in a liquid medium, which process is characterized by adding to the fluid medium a substance which is suitable for temporarily occupying the porosity of the cells of the fruits or other vegetables, and thus maintain the cells without any collapsing during the drying process so as to maintain the porosity by means of the liquid in which the cells are suspended. The drying process, however, is normally effected under vacuum and with antioxidants, chloroform or sulfurous acid is being added to the product in order to avoid oxidation thereof. This process, in a way, is somewhat complicated and has not gained any commercial penetration in the market.

Japanese publication No. 18 258/70, describes a fractionation process for obtaining a powdered dehydrated tomato product, in which the tomato pulp is fractionated in order to separate the serum from the remaining solids, and the serum is admixed with monoglycerides, foamed and dehydrated by lyophilization. The remaining solids are also lyophilized and the resultant products are admixed in order to obtain a dehydrated product in less time than when the same lyophilization process is used with the integral product. This publication, however, may be regarded to be included within the fractionating and lyophilized processes described above, with the consequent disadvantages already mentioned.

Japanese publication No. 16 619/73, also describes a lyophilization process for dehydrating various product including tomatoes, and incorporates anti-oxidants an flavor potentiators for avoiding oxidation of the material as well as preservation of the original flavor.

U.S. Pat. No. 4,031,266 patented June 21, 1977 and assigned to General Foods Corp., describes a process for drying an admixture of tomato paste and unmodified starches by the use of a drum drier in order to obtain flakes which are thereafter milled to produce the final product. It is necessary to add certain additives for recovering the original flavor of the tomato, which is a definite disadvantage over the absence of said additives, and the drum drying process used has the disadvantages already discussed above.

Dutch Patent No. 7,601,204 published Aug. 9, 1977 refers to the obtention of animal or plant material concentrates by separating the liquid fraction from the original product in order to reduce the time of evaporation, using less energy and causing less thermal damage to the product. This patent, however, merely refers to the obtention of the paste material and is not related to the drying process itself, inasmuch as it merely mentions that the product thus obtained by the above fractionation of the material, may be used for the obtention of powders including tomato powder.

U.S.S.R. Patent No. 581,919 on Nov. 30, 1977 describes a method for the obtention of tomato powder having characteristics of fast reconstitution, said process comprising the spray drying of tomato pulp admixed with a predetermined proportion of starch, in order to obtain agglomerates that are thereafter thoroughly dried with air. The process described in this patent, however, includes two drying stages, one which is effected by spray drying of the tomato pulp with the addition of starch and one other which is effected by means of air for drying the agglomerates produced in the first drying stage, and with the incorporation of additional starch in this second drying stage. The addition of starch and the rather complicated drying process used, renders this process uncapable of large capacities.

Italian Patent No. 1,045,453 of Nov. 18, 1975, describes a process for the preparation of a powdered tomato product, which uses a drum drying process wherein the initial product is formulated by the admixing of tomato juice with a thickener product and heating on the drum to a temperature of about 113° C. in an atmosphere of low relative humidity. This process, therefore, shows the same disadvantages already discussed above for the drum drying type of drying process.

East German Patent No. 201,847 of Aug. 17, 1983, describes a process for drying tomatoes, which may use any drying process, provided that the tomato concentrate having approximately 30% of solids, is admixed with a relatively high proportion of a thickening agent such as dextrins and with a certain proportion of common salt, and homogenizing the mixture before subjecting the same to the drying process. It is alleged that the dried product obtained, upon reconstitution by rehydration, preserves the characteristic flavor of tomato and the color thereof, and the salt is alleged to provide a more grainy characteristic to said powder. However, the addition of these additives in relatively large proportions to the tomato concentrate may be regarded as a definite disadvantage over the processes that do not use said type of additives.

To the knowledge of applicant and after having effected a relatively large number of tests, by using the processes of the prior art described above, it has been concluded that the main parameters associated with the decrease in the quality of the powdered dehydrated tomato products, are: a) the abuse to which the juice is subjected during the processing thereof in order to obtain the paste, b) the existence of occluded air in the paste which causes oxidation problems in the further steps of the process, and c) the particle size of the final product obtained by said processes, which given its hygroscopicity, tends to promote the formation of agglomerates which gradually suffer damages such as discoloration, as well as loss of free flow, taste and aroma.

On the other hand, a relatively large proportion of the products obtained by the prior art methods described above, either contain or are admixed with starches, dextrins and other filling agents, as well as anti-caking agents, thickening agents and the like, which also damage the characteristics of flavor, color and aroma and therefore render the thus obtained products inadequate to be compared with completely natural products. Some other processes, particularly when the fruit is ruptured by the cold breaking method, require the addition of considerable amounts of thickeners, in view of the fact that by the cold breaking process, the pectinolytic enzymes are inactivated and therefore the rehydrated product lacks body and consistency unless certain amounts of thickeners are added.

The only processes that have been able to avoid oxidation of the product during the drying step, are those utilizing lyophilization, which is a relatively costly and slow method, that has not gained sufficient importance in the market. All other processes, due to the existence of oxygen in the paste and due to the fact that they are carried out normally at relatively high temperatures, cause considerable scorching and oxidation of the product, which also tends to discolor the same as well as to cause a loss of flavor and aroma in the reconstituted product, thus producing products that are not favorably compared with natural products These oxidation processes, obviously, also damage the vitamin C content of the products, beside the obvious damage of the organoleptic and rheological properties of the thus obtained dehydrated tomato products.

OBJECTS OF THE INVENTION

Having in mind the defects of the prior art processes for dehydrating tomatoes, it is an object of the present invention to provide a process for dehydrating tomatoes which will not require the addition of any substance or additive to facilitate the drying or handling of the product, and which will therefore produce a completely natural product It is another object of the present invention to provide a process for dehydrating tomatoes, of the above described character, which will be economical and which may be carried out in simple and compact equipment.

One other object of the present invention is to provide a process for dehydrating tomatoes, of the above identified character, which by simple means will furnish a product having a large particle size which will not affect the reconstitution properties by rehydration and will not have the tendency to agglomeration One other and more particular object of the present invention is to provide a process for dehydrating tomatoes, which without the addition of anti-oxidant agents will be capable of retaining a suitable concentration of vitamin C, as well as the organoleptic and rheological properties of the product, such as the color, flavor, aroma, texture, shelf life, stability and handling of the reconstituted product.

One other object of the present invention is to provide a process for dehydrating tomatoes, of the above described character, which without the need of the addition of thickening agents, will preserve the rheological properties such as texture and consistency of the reconstituted product, and will diminish the contamination of the finished product in view of the large particle size thereof.

The foregoing objects and others ancillary thereto are preferably accomplished as follows:

According to a preferred embodiment of the present invention, a process for the dehydration of tomatoes which provides improved organoleptic and rheological characteristics in the reconstituted product, comprises the steps of:

a) selecting the tomato fruit;

b) washing the selected tomato fruit with a biocide and rinsing with fresh water;

c) cutting the rinsed fruit into approximately cubical chunks;

d) subjecting the tomato chunks to a blanching step by heating the chunks to a temperature of from about 80° to about 100° C. for a period of time less than about 10 minutes, in order to deactivate the enzymes such as lypoxygenases and pectinolytic enzymes for preventing deterioration of the organoleptic and rheological properties of the reconstituted product;

e) cooling the blanched chunks to a temperature of from about 5+ to 18° C.;

f) refining or pulping the cooled tomato chunks for removing the skin and seeds in order to produce a tomato juice with a solids concentration of 5° to 6° Bx;

g) evaporating the juice under vacuum until a tomato concentrate having a solids content of from about 20 to 32% is obtained;

h) subjecting the tomato concentrate to an air removal step either by applying vacuum to extract the air trapped within the concentrate during the previous steps or preferably by displacing the air with an inert gas such as $CO_2$ or nitrogen, in order to avoid oxidative reactions during the drying steps;

i) forming the paste-like tomato concentrate into films, strips or spheres having a thickness or a diameter of from about 1 to 3 mm, respectively;

j) drying the films, strips or spheres firstly under vacuum to produce a slight expansion of the product and to decrease the moisture content to levels of 8-15% and thereafter at ambient pressure until the moisture content is of from 3 to 4%.

BRIEF DESCRIPTION OF THE DRAWING

The novel features that are considered characteristic of the present invention are set forth with particularity in the appended claims. The invention itself, however, both as to its organization and its method of operation, together with additional objects and advantages thereof, will best be understood from the following description of specific embodiments when read in connection with the accompanying drawing, in which:

DETAILED DESCRIPTION

Figure 1:
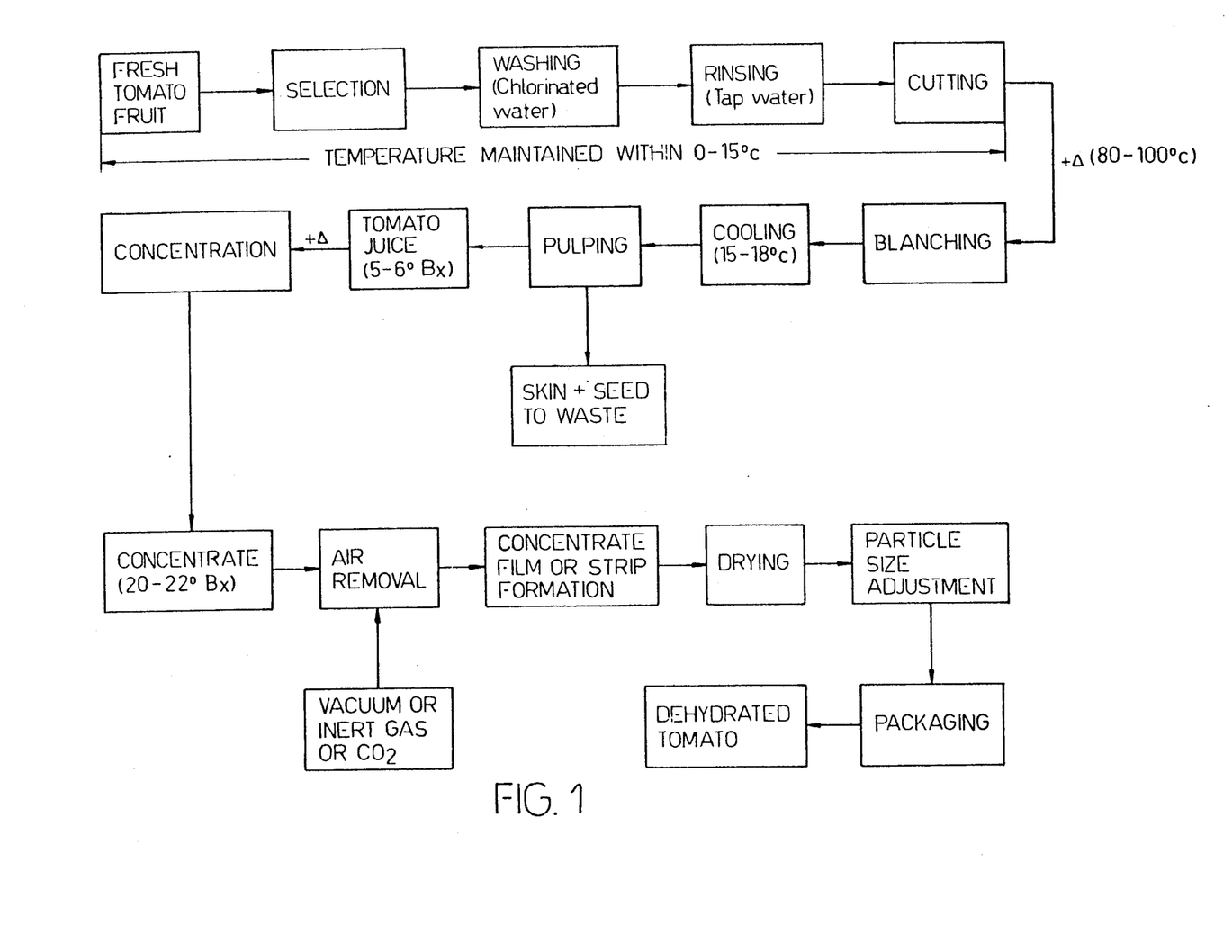
FIG. 1 is a flow diagram representing the sequence of steps of the process of the present invention.

Having now more particular reference to FIG. 1 it may be seen that the process for dehydrating tomatoes in accordance with the present invention essentially comprises the steps of selecting the tomato fruit in order to use only red, ripe tomatoes having a firm texture, which will not show physical damage or sunburns nor any indication of microbiological damage. The selected fruits are washed with a biocide in water, and thereafter are rinsed with fresh water and cut into chunks.

The tomato chunks are thereafter subjected to a blanching operation for inactivating enzymes such as pectinases, polygalacturonases and lypoxygenases and after the blanching operation, the temperature of the product is lowered in order to avoid any thermal damage essentially on the pigments, vitamins and carbohydrates.

The blanched cold product is thereafter passed through a pulper having a screen to remove the husk or skin and seeds, whereby a juice having a solids content of 5 to 6% by weight is obtained.

The pulped or refined juice is concentrated in a vacuum film evaporator, preferably having an active surface sufficient to accomplish the goal of obtaining a concentrate having a soluble solids content of from 20° to 32° Bx.

The thus evaporated product or concentrate should not be furtherly concentrated at higher solids levels, due to the fact that the preservation of the pectic substances provides a product with an excessively high viscosity which does not permit the same to flow through the equipment, thus rendering the heat transfer somewhat non-homogeneous. The high viscosity normally produced by the evaporation facilitates the handling of the product through the drying stages.

As an important step of this process, the concentrate is subjected to an air removal step by displacement of the air with $CO_2$ or with other inert gases, or under vacuum, this operation having as its basic purpose to remove the oxygen from the product in order to avoid oxidation of vitamin C and, consequently, in order to preserve the original nutritional value and avoid the oxidation of the lycopene with the consequent preservation of the color quality.

The thus treated product may be dehydrated in the form of films, strips or small spheres, although in accordance with the preferred embodiment of the present invention, it is more favorable to work with the product in the form of strips or spheres, inasmuch as it has been proven that this shape of the product produces the best results.

In view of this fact, it is preferred to form the tomato concentrate having a solids content of from 20 to 32%, into strips that are obtained by extruding the paste or concentrate through a cylinder having a conical spinneret of a diameter of approximately 4 mm, in order to obtain and extruded cylinder, which on placement on a flat surface acquires the shape of a strip.

The drying step is preferably effected in two stages, the first stage with the purpose of causing a slight expansion of the product, for which purpose said drying stage is effected preferably in a vacuum drier such as a pan or belt drier. In this stage, the moisture content is reduced down to about 8 to 15% whereafter the product may be handled without any difficulty.

The second drying stage is effected at ambient pressure, and for this purpose many types of driers are suitable for use in the process of the present invention, such as fluidized bed driers, pan driers or belt driers with parallel stream of air. In this stage the moisture level obtained secures the physical, chemical and microbiological stability of the product. The dehydrated product obtained from this stage shows moisture contents of from 3 to 4%, and has a slightly expanded porous structure which facilitates its dehydration, as well as relatively large particle size, which prevents the adherence of particles or the formation of agglomerates. The color of this product is normally bright red and the product maintains suitable levels of vitamin C. The reconstituted product preserves the sensory (organoleptic) attributes of color, flavor and aroma, as well as the rheological attributes of consistency of the fresh product.

More particularly, the process of the present invention involves a selection step which may be carried out on tables with sanitary surfaces free of scratched angles and crevices, whereas the washing operation is preferably effected by the use of washing machines or systems that may serve at the same time for conveying the tomato to the cutting machines.

The cutting step may be effected through the use of any commercial equipment, but it is an indispensable condition that all the parts of the equipment which may enter into contact with the product be built of stainless steel or other material that does not produce any damaging action on the product, and is not susceptible to corrosive attack by acids.

It is preferred to use a cutting machine such as a Hobart processor having cutting knives and a controlling device for obtaining cubic chunks of approximately 1 inch per side.

All the above steps, namely the selection step, the washing and rinsing steps, and the cutting step, must preferably be effected at a low temperature such as of from 0° to 15° C., in order to minimize the enzymatic activity before the blanching step, as well as any thermal damage of the product after the blanching step.

The blanching step may be effected on the tomato cubic chunks, by heating with steam or hot water the chunks until temperatures of from about 80° to about 100° C. are obtained for periods of time lower than about 10 minutes. However, the blanching step in accordance with the preferred embodiment of the present invention is preferably effected by heating the tomato chunks at the temperature of about 80° to about 100° C. during a period of time of about 1 to 7 minutes in order to inactivate the lypoxygenases and the pectinolytic enzymes, which require heating to a temperature of about 70° C. for at least one minute, regardless of the fact that this blanching process may leave an active fraction of the lipoxygenase having a molecular weight of about 5,000, identified as hematin, which has a slight oxidative action on the linolenic acid, but for the inactivation of which a thermal treatment of more than 60 minutes at a temperature of 80° C. is required, which produces an impractical situation for this type of processes, particularly considering that the effect of this substance, (hematin), on the sensory qualities of the dehydrated products, has not been well established. Therefore, the blanching step of the process of the present invention preferably comprises the heating of the tomato chunks at a temperature of from about 80° to about 100° C. during a period of time of approximately 1 to 7 minutes, for the purpose of: a) inactivating the enzymes, in order to permit the preservation of the color, to avoid the development of bad flavors and to maintain the consistency and the texture of the finished product; b) to exclude the air of the tissues, which minimizes the oxidative processes; c) to decrease the initial microbial load; and d) to soften the tissues, in order to facilitate and increase the extraction of the juice in further steps of the process.

The blanching operation in accordance with the present invention is preferably carried out through the use of heat exchangers which may permit to raise the temperature to about 80° C. in a short period of time, to maintain the temperature at this level for about on minute and to thereafter quickly cool the product to maximum temperatures of from 15° to 18° C.

Although many different types of heat exchangers exist to carry out the blanching operation, in the process of the present invention an open kettle having a heating jacket and a stirrer was used, which was able to raise the temperature of batches of from about 15 to 20 Kgs., of tomato chunks from 0° to 15° C. initial temperature, to 80° C. final temperature in a period of time of from about 4 to 5 minutes. The blanched product was thereafter discharged into stainless steel tanks provided with stirrers, said tanks being cooled by means of suitable refrigeration, in order to reduce the temperature of the blanched product to a temperature of from about 15° to about 18° C. as quickly as possible. This cooling operation is indispensable to preserve the color of the product in the further steps of the process.

The refining or pulping step is effected by feeding the blanched cooled tomato chunks to a pulper having all the area which enter into contact with the product built of stainless steel or other material that will not cause any oxidation in the product and further more the material should not be susceptible to corrosive attack by acids. For this step it is preferred to use a pulper such as the Langeskamp type of pulper, having a screen with openings of about 0.84 mm, with which equipment one single pass of the material is sufficient to remove all the skin and seeds from the pulp and to produce a juice with a total solids content of 5 to 6° Bx. It is very important to point out that the pulping operation introduces relatively large amounts of trapped air into the product, which is a highly undesirable situation, inasmuch as the oxygen of the trapped air may seriously affect the concentration of vitamin C and the natural color of the product.

The juice or pulp obtained from the pulper is thereafter concentrated and the concentration step is normally effected by the use of vacuum induced film evaporators, although other type of evaporators could also be suitably used for carrying out the concentration step of the process of the present invention. The conditions under which the concentrating or evaporating operation is effected, are preferably a gage pressure within the evaporator of from 15 to 18 inches of vacuum, a temperature of the heating medium (which is normally an outer heating medium such as steam, oil or other external heating medium) of from 138° to 143° C., and the evaporation operation is controlled such that the product within the evaporator has a temperature not higher than from about 52° to about 60° C. The speed of operation is controlled such that the evaporation of water is not higher than 1 Kg. $H_2O$/min, whereby the feed flow of the juice into the evaporator is regulated in order to obtain, at this maximum speed of evaporation of water, a concentrate which will present a total solids content of from about 20 to 32%, without causing serious thermal damages to the product and such that the product will still preserve a certain proportion of dissolved air, which is thereafter removed in order to avoid oxidation of vitamin C and of the color components of the product.

As mentioned above, the pulping operation introduces relatively large amounts of trapped air into the product, and although the evaporation step eliminates much of said air, the concentrate obtained from the evaporators still may contain relatively high proportions of dissolved air, which may cause very serious oxidative damage to the product in the further steps of the process. Therefore, one of the most important steps of the process in accordance with the present invention, is the removal of the air occluded in the product obtained from the evaporation of the juice, that is, from the concentrate obtained from the evaporators, which operation may be carried out in two different forms, namely, by subjecting the concentrate to vacuum in order to extract the air from the concentrate, or preferably by displacement of the air with an inert gas such as carbon dioxide or nitrogen.

One practical manner of carrying out the displacement of the air in accordance with the present invention, is the addition of solid carbon dioxide in a proportion of from about 1 to 3% with respect to the total weight of the concentrate, the solid carbon dioxide being incorporated into the concentrate in very small fragments, and admixing in a suitable manner in order to produce a homogeneous distribution of the solid carbon dioxide within the concentrate. It is clear that the sublimation of the dry ice or solid carbon dioxide generates gaseous carbon dioxide, which automatically displaces the air from the product. However, other methods of introducing into the concentrate an inert gas or carbon dioxide may be used for the purpose of displacing the air from the body of the concentrate, without departing from the true spirit of the present invention. The important condition to be observed in the process of the present invention is the fact that the occluded air must be removed from the concentrate obtained from the evaporation or concentration step, in order to avoid further oxidating processes caused by the existence of oxygen within the body of the concentrate.

As mentioned above, it has been determined that the drying operation of the concentrate obtained in accordance with the above described steps of the process of the present invention, may be more efficiently carried out by firstly forming the concentrate into relatively thin strips having a thickness of from about 1 to about 3 mm, although it must be stressed that the drying of this product may be made by subjecting the concentrate in different shapes such as films or as small spheres to the drying operation, without departing from the true scope and spirit of the present invention.

The preferred embodiment of the drying step in accordance with the present invention comprises subjecting the concentrate previously formed into strips of a thickness of from about 1 to about 3 mm, to a drying step comprising two different stages. The first stage is effected under reduced pressure conditions, preferably at a reduced gage pressure of about 22 inches, and at a temperature of from about 58° to about 62° C. for a period of time of from about 0.5 to about 1.0 hours. Under these conditions, the moisture of the product is decreased to levels of from about 10 to about 15%, which permits the mechanical handling of the product in a suitable manner, and the partially dried product is thereafter subjected to second drying stage, which is effected at ambient pressure, for instance, in a fluidized bed drier, with a parallel air stream and with the air streaming at a speed of from about 2.0 to about 2.5 m/s, at a temperature of from about 58° to about 60° C. and for a period of time of from about 5 to about 7 hours.

In accordance with the preferred embodiment of the process of the present invention, it is important to carry out the drying step in the above described two consecutive stages, inasmuch as the two-stage drying operation is such that, during the first stage which is carried out under vacuum, a slight expansion of the product is produced, which does not modify to any noticeable extent the original structure of the original paste, but which generates in the material a porosity of sufficient degree to become stable, which is of extreme importance to provide suitable properties of rehydration to the product. Also, this stage causes the product to acquire a moisture level sufficiently reduced to provide resistance to mechanical handling in the further steps of the process, and to avoid the collapsing of the thus generated porous structure.

The second drying stage which is carried out at ambient pressure, has as its purpose to carry the product to moisture levels which may secure stability, both from the microbiological standpoint and from the physical and chemical standpoints, whereby moderate temperatures must be used that will not affect the aromatic compounds, the color and the sugar content of the product.

The thus obtained product shows as a very important characteristic the retention of the red color which may be regarded as being at least 86% of the original red color of the starting material, and also the retention of the concentration of vitamin C, which may be regarded as being of at least 90% with respect to the vitamin C contained in the concentrate. The product shows, in view of the porous structure obtained, the remarkable property of being reconstituted to a product that very much resembles the natural product. Furthermore, in view of the relatively large particle size, the product of the present invention does not show any tendency to agglomeration, and it is to be pointed out that the particle size may be adjusted to any specific requirements by a simple breaking of the dehydrated solid, whereby also a very high shelf life for periods of time of from 3 to 6 months without any necessity of incorporating additives is produced. Finally, the product retains most of the organoleptic and rheological properties of the natural product, particularly showing sensory characteristics (flavor, aroma, color, etc.) that are extremely similar to the fresh product.

The following examples will more clearly illustrate the nature of the process of the present invention, said examples being merely illustrative of preferred embodiments of the process but must not regarded as limitative of the scope of the invention.

EXAMPLE 1

100 Kg. of selected tomatoes represented by homogenous fruits having a red color and a firm texture, which are free of physical or microbiological damage, were washed in a flooded system with a ratio of tomato to water of 1:1.5-2.0. The water used in the washing operation was previously treated with chlorine in order to provide a concentration of about 100 ppm of chlorine. The washed product was rinsed with tap water and was cut by passing the same through a machine which cut the product in cubic chunks of about 1 inch per side. During this operation a small amount of juice was released which was reincorporated to the material stream for subjecting the same together with the chunks to the further steps. During the above described stages of the process, the product was maintained at temperatures of from 15° to 18° C. through the use of receptacles permitting the application of cooling systems by running ice water therethrough. The cut material was passed to a heating system and the chunks were heated until a temperature of from 80° to 90° C. was reached, and this temperature was maintained for a period of 1 minute.

The thus treated tomato was quickly cooled to a temperature of from 15° to 18° C. by passing the same through a cooling system, and the cooled product was pulped in a pulper, from which 85% of pulp and 15% of skin and seeds were obtained. The skin and seeds were discarded and the pulp was concentrated in a vacuum ascending film evaporator, at a minimum 9a9e pressure of 18 inches vacuum, and maintaining the temperature of the product during the concentration at from about 65° to about 68° C. In this operation 25.8 Kg. of paste having a solids content of 21.2% was obtained.

The air was removed from the concentrate by application of vacuum and the product was extruded in the form of strips which were subjected to a drying-expansion step in two stages. The first stage was carried out under vacuum during a period of time of from about 35 to 40 minutes at a temperature of 60° C. and at a gage pressure of 22 inches of vacuum. The second step was effected at a temperature of 58°-59° C. during a period of time of from about 6.5 to 7 hours, whereupon 5.2 Kg. of dehydrated product having 3.0% moisture were obtained. The yield on the basis of initial solids was of 84%.

EXAMPLE 2

With the paste obtained by using the process described in Example 1, two different batches of products were dried in two stages, the first stage under vacuum (22 inches) during 35 to 40 minutes and the second stage under ambient pressure during 7.5 hours.

Table 1 shows the drying conditions and the results obtained for moisture, vitamin C concentration and color characteristics.

As it may be observed in table 1, the retention of vitamin C is extremely high and the color only diminishes very slightly in the scales of luminosity (L) and reds (a).

EXAMPLE 3

The tomato concentrate obtained in accordance with the process of Example 1 was treated with carbon dioxide in the case of samples 1, 2 and 3, and was not treated with carbon dioxide in the case of samples 4 and 5, which therefore maintained the initial amount of air contained in the paste, and the paste was subjected to drying under the same conditions already described in Example 2.

The results obtained are shown in table 2, from which it may be noted that a better retention of vitamin C and red color, and a lower concentration of brownish compounds ($E_{380}$) was obtained in the samples treated with carbon dioxide as compared to those in which said gas was not added to remove the air from the concentrate.

TABLE 2

CHARACTERISTICS OF THE RECONSTITUTED TOMATO JUICE FROM A CONCENTRATE TREATED WITH $CO_2$ AND UNTREATED

| SAMPLE | MOISTURE % | mg VITAMIN C per 100 g/T.S./* | COLOR: HUNTER LAB | | | COLOR | |
|---|---|---|---|---|---|---|---|
| | | | L | a | b | $E_{472}$ | $E_{380}$ |
| TREATED WITH $CO_2$ | | | | | | | |
| Initial Paste | 74.3 | 237.8 | 24.7 | 27.4 | 12.3 | 3.82 | 0.32 |
| 1 | 3.3 | 247.9 | 23.9 | 26.4 | 12.0 | 3.50 | 0.38 |
| 2 | 4.0 | 227.6 | 23.9 | 26.3 | 12.3 | — | — |
| 3 | 3.5 | 232.3 | 24.2 | 26.4 | 12.3 | 3.67 | 0.35 |
| UNTREATED | | | | | | | |
| Initial Paste | 81.2 | 230.8 | 24.0 | 27.1 | 11.4 | 3.86 | 0.35 |
| 4 | 6.1 | 175.5 | 23.3 | 25.1 | 11.7 | 3.61 | 0.67 |
| 5 | 2.9 | 141.5 | 24.2 | 26.1 | 12.2 | 3.18 | 0.41 |

*Total Solids

EXAMPLE 4

With the product obtained from the dehydration of the tomato concentrate, in accordance with the process of the present invention, the behavior during storage was evaluated, taking as a quality criterion the variation in the content of vitamin C. The product was stored during four months at room temperature using glass containers or polylaminated aluminum packages. The vitamin C evaluation was effected at time 0 and after one and four months respectively.

Table 3 shows the results obtained, from which it may be noted that the retention of vitamin C was superior to 90 and 70% after one and four months of storage respectively. The type of packaging did not significantly affect the retention of vitamin C.

TABLE 1

DRYING CONDITIONS AND CHARACTERISTICS OF THE DEHYDRATED AND RECONSTITUTED PRODUCT

| TEST No. | DRYING TYPE | DRYING TEMPERATURE °C. | DRYING TIME | MOISTURE OF THE PRODUCT % | VITAMIN C mg/100 g T.S.[1] | COLOR: HUNTER LAB[2] | | |
|---|---|---|---|---|---|---|---|---|
| | | | | | | L | a | b |
| 1 | Vacuum | 60 ± 2 | 35 min | 11.5 | | | | |
| | Ambient Pressure | 59 ± 3 | 7.5 hrs. | 3.8 | 148.0 | 23.8 | 26.3 | 11.7 |
| 2 | Vacuum | 60 ± 2 | 40 min | 10.9 | | | | |
| | Ambient Pressure | 58 ± 2 | 7.5 hrs. | 3.9 | 145.0 | 22.7 | 25.2 | 11.1 |
| Fresh Tomato Initial Characteristics | | | | 96.4 | 160.7 | 25.2 | 29.1 | 11.6 |

[1] Total Solids
[2] Of the Reconstituted Product

TABLE 3

VARIATION IN THE CONTENT OF VITAMIN C[1] IN SAMPLES OF DEHYDRATED TOMATO STORED AT ROOM TEMPERATURE IN TWO TYPES OF RECEPTACLES.

| SAMPLE No. | INITIAL CONCEN- TRATION[2] | TIME OF STORAGE | | | | | | | |
|---|---|---|---|---|---|---|---|---|---|
| | | 1 MONTH | | | | 4 MONTHS | | | |
| | | Glass | % Retention | Aluminum | % Retention | Glass | % Retention | Aluminum | % Retention |
| 1 | 240 | 239 | 99 | 234 | 97 | 182 | 76 | 182 | 76 |
| 2 | 250 | 233 | 93 | 231 | 92 | 191 | 76 | 194 | 78 |
| 3 | 244 | 234 | 96 | 222 | 91 | 186 | 76 | 185 | 76 |
| 4 | 240 | 227 | 95 | 229 | 95 | 165 | 69 | 170 | 71 |

[1] mg/100 g of total solids
[2] In the dehydrated product

It may be seen from the above that a process has been provided which does not require the addition of adjuvants to preserve the rheological and organoleptic characteristics of the dehydrated product, and which by simple means avoids the oxidative reactions which seriously affect the vitamin C contents and the color and flavor and aroma characteristics of a dehydrated tomato product, which were not attainable by processes of the prior art unless some additives were added to the product or unless some highly costly procedures for drying such as lyophilization were used.

Although certain specific embodiments of the present invention have been shown and described above, it is to be understood that many modifications thereof are possible. The present invention, therefore, is not to be restricted except insofar as is necessitated by the prior art and by the spirit of the appended claims.

What is claimed is:

1. A process for dehydrating tomatoes, comprising the steps of:
    (a) selecting red, ripe tomato fruit having a firm texture;
    (b) washing the selected tomato fruit with a biocide and rinsing with fresh water;
    (c) cutting the rinsed fruit into approximately cubical chunks;
    (d) blanching the tomato chunks by heating the chunks to a temperature at or below the boiling point of water for a period of time less than about 10 minutes to inactivate the enzymes contained in the tomato chunks;
    (e) cooling the blanched tomato chunks to approximately room temperature;
    (f) pulping the cooled tomato chunks and removing skin and seeds from the pulped chunks to form a tomato juice;
    (g) evaporating the tomato juice under vacuum to form a tomato paste-like concentrate having a solids content of from about 20% to 32%;
    (h) removing the air trapped within the concentrate;
    (i) forming the concentrate into pieces having a maximum thickness or diameter of from about 1 mm to about 3 mm; and drying the concentrate pieces until the moisture content of said pieces is between about 3% to about 4%.

2. A process according to claim 1 wherein the selecting, washing, rinsing and cutting steps a) to c) are carried out at a temperature of from about 0° C. to about 15° C. in order to minimize enzymatic activity prior to the blanching step.

3. A process according to claim 2 wherein the blanching step d) comprises heating the tomato chunks to a temperature of from about 80° C. to about 100° C. for a period of time of 1 minute.

4. A process according to claim 3 wherein the heating of the tomato chunks is effected such that the temperature is raised within a period of time of not more than about 4 minutes.

5. A process according to claim 3 wherein the tomato chunks are cooled after the blanching step, to a temperature of from about 15° to 18° C.

6. A process according to claim 1 wherein the juice obtained in step f) has a solids content of from about 5 to about 6%.

7. A process according to claim 6 wherein the evaporation of the tomato juice is effected at a temperature of from about 50° to about 60° C. under vacuum.

8. A process according to claim 1 wherein the air is removed from the concentrate by the application of vacuum.

9. A process according to claim 1 wherein the air is removed from the concentrate by displacing the air by means of an inert gas.

10. A process according to claim 1 wherein the air is removed from the concentrate by displacing the air by means of carbon dioxide.

11. A process according to claim 10 wherein the carbon dioxide is applied to the concentrate in the form of dry particles which are homogeneously mixed in the concentrate.

12. A process according to claim 1 wherein the concentrate is formed into strips, films or spheres.

13. A process according to claim 11 wherein the drying step j) is carried out in two consecutive stages, firstly by partially drying the pieces of the concentrate under vacuum at a temperature of from about 58° to 62° C. until the moisture content of the pieces is reduced to 10–15%, and thereafter under ambient pressure at a temperature of from about 58° to 60° C. until the moisture content of the partially dried pieces is reduced to 3–4%, whereby a slight expansion of the pieces is obtained during the first drying stage that does not alter to any significant extent the original structure of the paste-like concentrate, but which generates a porosity which will facilitate the reconstitution of the dehydrated product by rehydration.

* * * * *